Figure 1:
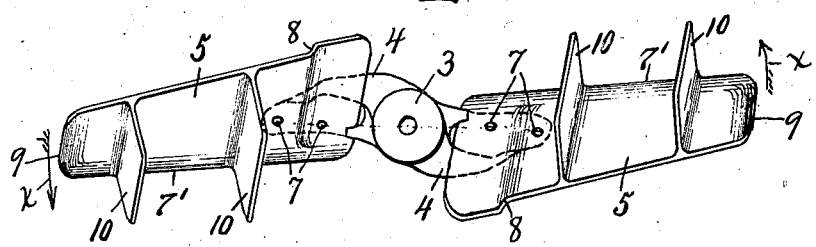

June 10, 1924.

W. R. WALKER

ROTARY IMPELLER FOR MECHANICAL DISHWASHERS

Filed June 20, 1921

1,496,958

INVENTOR
W. R. Walker
BY
Howard P. Denison
ATTORNEY

Patented June 10, 1924.

1,496,958

UNITED STATES PATENT OFFICE.

WILLARD R. WALKER, OF SYRACUSE, NEW YORK, ASSIGNOR TO WALKER BROTHERS COMPANY, OF SYRACUSE, NEW YORK, A CORPORATION OF NEW YORK.

ROTARY IMPELLER FOR MECHANICAL DISHWASHERS.

Application filed June 20, 1921. Serial No. 478,932.

*To all whom it may concern:*

Be it known that I, WILLARD R. WALKER, of Syracuse, in the county of Onondaga, in the State of New York, have invented new and useful Improvements in Rotary Impellers for Mechanical Dishwashers, of which the following, taken in connection with the accompanying drawings, is a full, clear, and exact description.

This invention relates to a rotary impeller for mechanical dish washers of the class set forth in my pending application #454,631 filed March 23, 1921.

In machines of this character, the openwork dish supporting trays are placed within the upper portion of a cylindrical vat having a conical bottom containing a relatively small quantity of water or other washing fluid adapted to be impelled upwardly through the trays and between and around the dishes by means of the rotary impeller revolving around and in close proximity to the conical bottom, and the main object of my present invention is to cause the washing fluid to be thrown upwardly with greater force and with a more equal distribution throughout the area of a dish-supporting-tray from the center to the periphery thereof and at the same time to maintain its circumferential movement so as to impinge against the dishes in said tray with a glancing impact to more effectively remove the refuse therefrom within a shorter period of time than has heretofore been practiced.

Another object is to conserve the washing fluid and the power necessary for the operation of the impeller and thereby to increase the working efficiency and economy of operation of the machine by reason of the relatively small quantity of water operated upon which enables the impeller to be driven at a relatively high speed to produce the necessary upward displacement of the water with great force.

Figure 2:
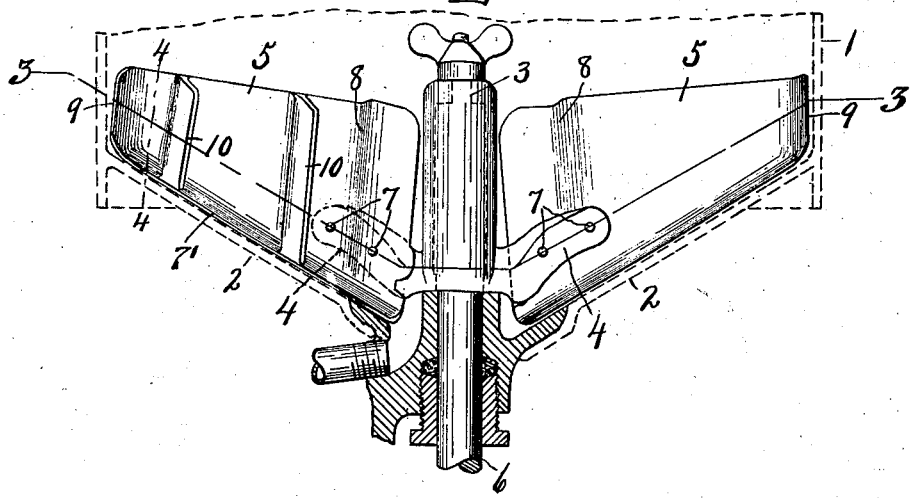

Other objects and uses relating to specific parts of the device will be brought out in the following description:

'In the drawings:

Figs. 1 and 2 are respectively, a top plan and a side elevation of an impeller embodying the various features of my invention, a portion of the vat being shown by dotted lines in Fig. 2.

Figure 3:
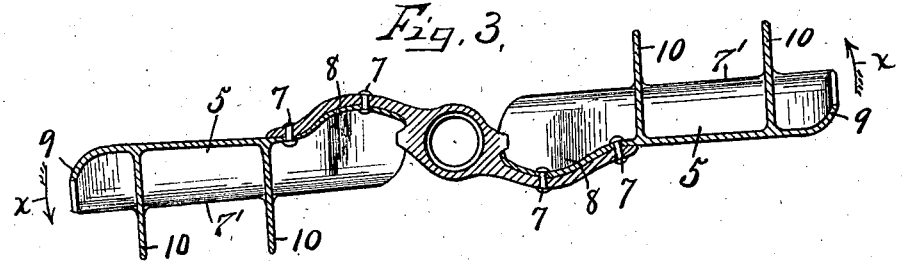
Figure 4:
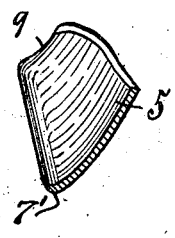

Figures 3 and 4 are respectively, a horizontal sectional view on line 3—3, and a vertical sectional view on line 4—4, Figure 2.

As illustrated, this impeller is adapted to be used in connection with a cylindrical vat —1— having a conical bottom —2— and comprises a hub —3— having laterally projecting wings —4— for receiving and supporting a pair of impeller blades —5— of substantially the same form and size so that they may be interchanged from side to side.

The invention lies more particularly in the construction of one of the blades but for counterbalancing purposes, two of them are shown at diametrically opposite sides of the hub —3—, and it is evident that any number may be used so long as they are evenly distributed around the axis of the hub when more than one is applied.

The impeller is rotated in the direction indicated by arrow —X— by any suitable driving means and is here shown as having its hub —3— secured removably to the upper end of a vertical shaft —6— which extends through an opening or bearing in the apex of the conical bottom —2— and may be connected to any suitable source of power (not shown).

The impeller blades are secured at their inner ends by rivets or bolts —7— to the outer ends of the wings —4— and extend outwardly from opposite sides of the hub —3— substantially tangential to opposite sides of the periphery thereof so as to incline in the direction of rotation from their inner ends toward their outer ends to partially resist the centrifugal flow of the washing fluid toward the periphery of the vat and thereby to carry a greater quantity of the washing fluid forwardly with a whirling motion as the impeller is revolved.

The main body of each impeller blade between the ends thereof and above the lower edge is substantially flat and inclined downwardly in the direction of rotation from its upper edge for the purpose of lifting the washing fluid and deflecting it upwardly as the impeller is rotated, the lower edge of each blade being curved at 7' in the direction of rotation for the same purpose and is inclined outwardly and upwardly from the axis of rotation of the impeller to conform to the angle of inclination of the bottom of the vat around which it is adapted to travel in close proximity thereto.

The upper edge of the blade is also inclined outwardly and upwardly but at a less angle to the axis of rotation of the impeller than that of the lower edge and therefore, each blade is tapered longitudinally from its inner end toward its outer end. The inner end of each blade above the lower curved edge thereof is offset rearwardly to form a transversely extending shoulder —8— on the front face of the plate, while the outer end of the blade is curved in the direction of rotation at —9— and together with the shoulder —8— serve in a measure to retard the centrifugal flow of the water along the front face of the blade toward the periphery of the vat as the impeller is rotated, thereby assisting each blade in lifting and impelling upwardly a greater quantity of water than would be possible if the impeller blade was flat throughout its area.

The degree of centrifugal flow or displacement of the washing fluid from the center toward the periphery of the vat is of course, largely dependent upon the speed of rotation of the impeller and while the tangential relation of the blade to the periphery of the hub together with the downward inclination in the direction of rotation and the abutments —8— and —9— are highly efficient in deflecting the water upwardly through a dish-supporting-tray arranged in close proximity to the upper edge of the impeller. It is desirable in some instances to use two or more trays one above the other for expediting the work, which requires the upward projection of the washing fluid with greater force in order to thoroughly cleanse the articles in the uppermost trays.

I find, however, that this increased force cannot be produced by merely increasing the speed of the impeller due to the fact that the increase of speed of the impeller causes a greater centrifugal flow of the washing fluid from the center toward the periphery of the vat, and in order to overcome this centrifugal flow of the washing fluid, each blade is provided with one or more, in this instance two, wings or baffle flanges —10— projecting from the main body thereof in the direction of rotation and extending transversely from the lower to the upper edge in the direction of the axis of rotation, said baffle wings or flanges being disposed in spaced parallel relation some distance from both ends of the blade and serve as impact plates.

That is, as the impeller is rotated, the blade takes up and deflects the washing fluid upwardly while the rotary motion of the impeller tends to displace the washing fluid from the center outwardly, and these two forces acting upon the washing fluid cause the latter to impinge against the inner faces of the impact plates or flanges —10— and thereby assist in deflecting the fluid upwardly, thus permitting the impeller to be revolved at a high speed to increase the force of upward projection of the fluid as it impinges against the plates or flanges —10—, which also serves to distribute the upwardly projecting water more evenly and across and around the entire area of the trays.

The inner faces of these impact plates —10— are substantially flat and perpendicular so that when the washing fluid is brought forcibly against them as centrifugal displacement from the center outwardly, it is immediately spread out and deflected upwardly in more or less the form of sheets or fans and by reason of its whirling motion caused by the rotation of the impeller, more readily covers the entire area of the dish-supporting-trays through which it passes for glancing impact with the dishes therein to effect a thorough cleansing thereof within a much less period of time than would be required without the use of the impact plates or flanges —10—.

What I claim is:

1. An impeller blade disposed to rotate about a vertical axis and provided with wings projecting therefrom in the direction of rotation and extending crosswise thereof in the direction of said axis.

2. An impeller blade as in claim 1 in which the lower lengthwise edge of the main body is inclined transversely in the direction of rotation.

3. An impeller blade as in claim 1 in which the lower lengthwise edge of the main body is inclined longitudinally upwardly and outwardly from its inner end.

4. In combination with a fluid container having a conical bottom, an impeller rotatable about a vertical axis coaxial with the vat and provided with tangentially disposed blades in uniformly spaced relation about said axis, said blades having their lower edges inclined longitudinally to conform to the inclination of the bottom of the vat and also inclined in the direction of rotation for lifting and projecting the fluid upwardly as the impeller is rotated, said blades being provided with wings projecting therefrom in the direction of rotation of the impeller.

5. In combination with a fluid containing vat, an impeller rotatable about a vertical axis within said container and provided with tangentially disposed blades in uniformly spaced relation about said axis, said blades being also inclined transversely downwardly in the direction of rotation and provided with wings projecting forwardly therefrom in the direction of rotation.

6. In a mechanical dishwasher, a container for a washing fluid, a rotary vertical shaft journaled in the bottom of the container, and an impeller blade rotated by said shaft about the axis thereof and provided with a plurality of axially extending wings projecting therefrom in the direction of rotation.

7. In combination with a liquid containing vat having a conical bottom, an impeller rotatable about the vertical axis of the vat and provided with tangentially disposed blades in uniformly spaced relation about said axis, said blades having their lower edges inclined outwardly and upwardly from said axis in close proximity to the bottom of the vat and also inclined in the direction of rotation for lifting the fluid and projecting it upwardly, and flanges projecting from said blades in the direction of rotation of the impeller for impeding the centrifugal displacement of the liquid from the axis outwardly.

In witness whereof I have hereunto set my hand this 11th day of June, 1921.

WILLARD R. WALKER.

Witnesses:
H. E. CHASE,
M. R. COOKE.